No. 804,563. PATENTED NOV. 14, 1905.
R. F. STEWART.
BUTTER CUTTING MACHINE.
APPLICATION FILED SEPT. 10, 1904.

Witnesses

Inventor
Richard F. Stewart.
By his Attorney

No. 804,563. PATENTED NOV. 14, 1905.
R. F. STEWART.
BUTTER CUTTING MACHINE.
APPLICATION FILED SEPT. 10, 1904.

Witnesses

Inventor
Richard F. Stewart.
By his Attorney

UNITED STATES PATENT OFFICE.

RICHARD F. STEWART, OF POCANTICO HILLS, NEW YORK.

BUTTER-CUTTING MACHINE.

No. 804,563.  Specification of Letters Patent.  Patented Nov. 14, 1905.

Application filed September 10, 1904. Serial No. 223,982.

*To all whom it may concern:*

Be it known that I, RICHARD F. STEWART, a citizen of the United States of America, and a resident of Pocantico Hills, town of Mount Pleasant, county of Westchester, State of New York, have invented certain new and useful Improvements in Butter-Cutting Machines, of which the following is a specification.

The present invention relates to machines for cutting and molding blocks or prints of butter of different size and weight from a mass of butter as it comes from the tubs or firkins without packing or pressing the butter during the cutting and molding operations so as to destroy the grain of the butter or express therefrom the juice or liquor contained in the original mass.

The object of the invention is to provide an organized machine capable of receiving a mass of butter which is to be cut up, dividing it into slabs or bars, molding and shaping such bars to the proper size, and then subdividing the bars into blocks or prints of the desired size and weight in an expeditious and economical manner, the machine for the most part being automatic in its action.

In the accompanying drawings, forming part of this specification, and in the several views of which like reference-numerals refer to like parts,
Figs. 6 and 7 are sectional side views of the longitudinal cutting and molding mechanism through the line 6 6, Fig. 1.
Fig. 8 is an enlarged view of the top unlocking and plunger-stopping devices on the cutting and molding box.
Fig. 9 is a side elevation of the cutting mechanism for the longitudinal cutter.
Figs. 15 and 16 are side and edge views, respectively, of the keys for securing the cutting-wires.

In forming butter into blocks or prints it is very desirable that the blocks shall be cut from the original package without pressing and that all packing or crowding into molds be avoided, so that the grain of the butter may be preserved uninjured and all the original liquid or juice retained, and it is essential, moreover, that all the blocks or prints shall be of one uniform weight and size. In the present improvement the mass of butter as it comes from the tub or other similar package is cut into long slabs or sections or may be molded or formed from fragments of slabs or sections or small pieces of butter into such long slabs, which slabs are then cut into blocks of the desired size, and this cutting and molding is effected without pressing or packing the butter so as to injure its grain or press out its juice and so as to insure the formation of blocks of a certain uniform size and weight.

Figure 1:
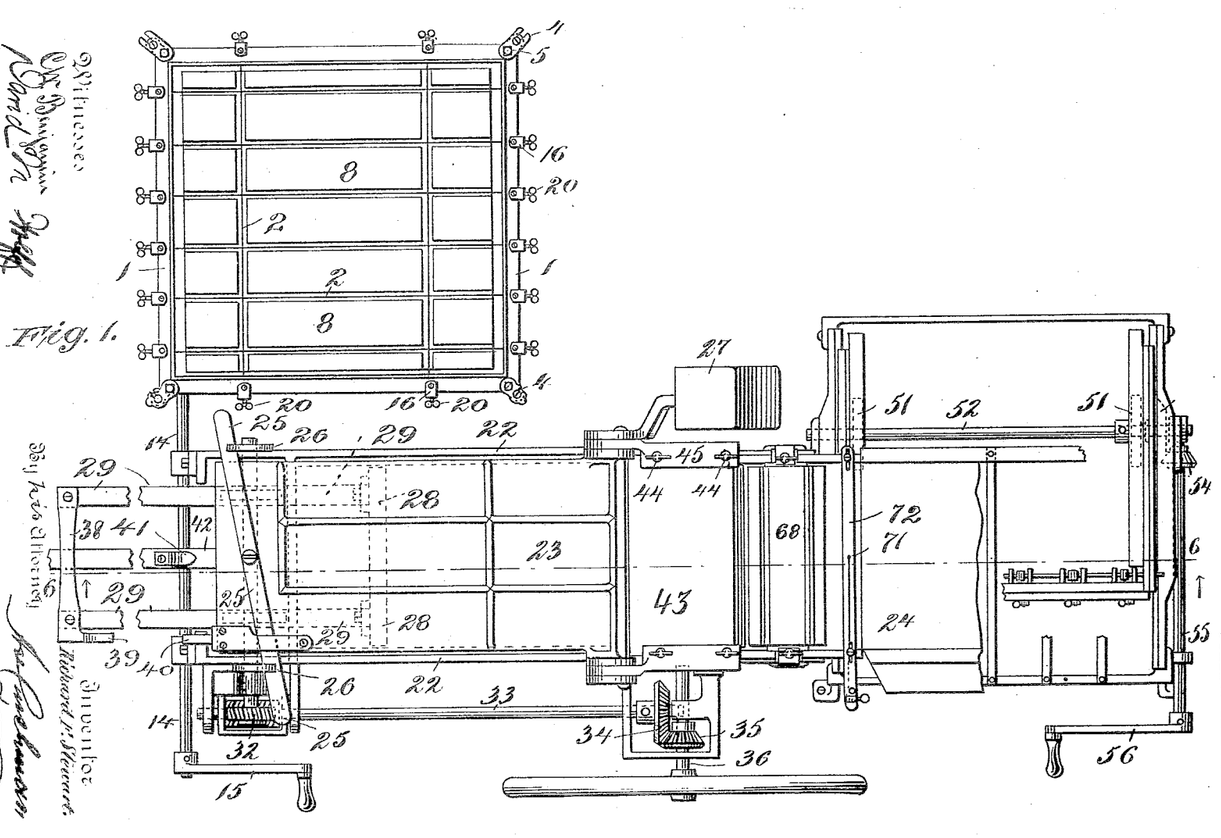
Figure 1 is a plan view of the complete cutting and molding machine.
Figures 2, 4, 5:
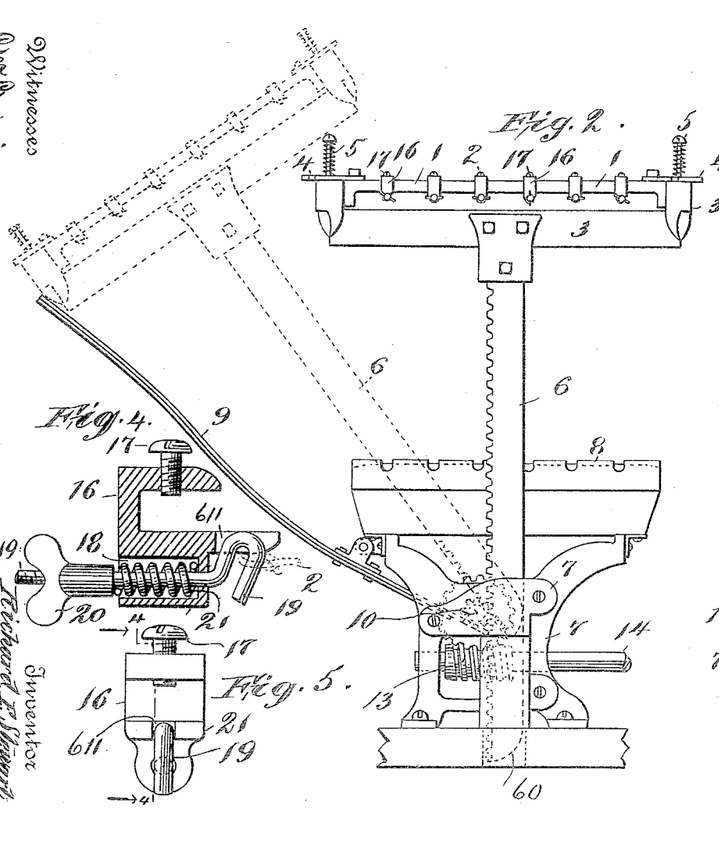
Fig. 2 is a side elevation of the vertical cutter, showing the same in dotted lines inclined or tilted to permit the butter to be put on the bed.
Figs. 4 and 5 are enlarged views of one of the keys or fastening devices by which the cutting wires on the vertical cutter are secured to the cutting-frame.
Figure 3:
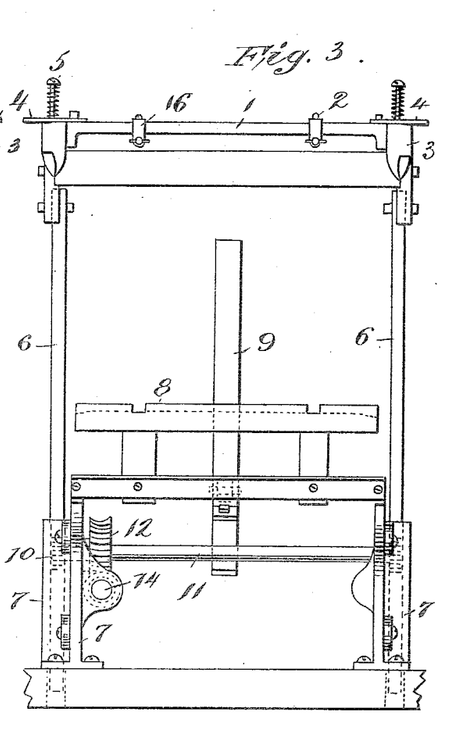
Fig. 3 is a front elevation of the vertical cutter.

In the particular construction of machine here shown and described the butter mass is first cut vertically into slabs or sections by the vertical cutter shown in Figs. 2 and 3. This cutter consists of a cutting-frame 1, across which are stretched the cutting-wires 2, Fig. 1, so adjusted and arranged as to cut the slabs of butter of a width and thickness to form blocks or prints of the size and weight desired. This cutting-frame 1 rests on and is attached to the frame 3 by the corner hooks or buttons 4. The attachment of the cutting-frame is such that it may be readily removed and another frame having a different adjustment of cutting-wires substituted in its place when it is desired to alter the size of the cut slabs of butter. On the corner hooks or buttons 4 are spring-posts 5, which hold the hooks in place and at the same time permit a yielding of the cutting-frame as it is drawn through the butter. The frame 3 is supported on the two upright side bars 6, which are preferably provided with racks by which it is moved up and down and the cutting-frame drawn down through the block of butter. As will be seen from Figs. 2 and 3, the lower ends of the rack-bars are held in and pass up and down through guides 7 on the bed of the machine, by which they are maintained and guided in an upright position as they move, and the movement of the bar on each side is rendered regular and even and the cutting-frame thereby held in a horizontal position as the cutting-wires are drawn through the cutter. Supported on the frame 7 between the bars 6 is the support or table 8, on which the butter rests as it is cut, which table may be of any suitable or desired construction. To facilitate the placing of the block or package of butter on the bed or table 8, the rack-bars, together with the frames when raised to their uppermost position, may be tilted to one side, as shown in dotted lines in Fig. 2.

To permit the cutter-frame to be readily tilted without entirely removing it from the guide 7 or disengaging the driving connection between the rack-bars 6 and their driving-gears, (presently to be described,) the lower ends of the said bars 6 are cut away or rounded off, as at 60, (see Fig. 2,) so that when the cutter-frame has been raised to its uppermost position the ends of the rack-bar 6 may turn without binding in the guides 7, the rack-bars and cutter-frame rocking on the driving-gears as their pivotal points, as will be apparent from the dotted-line position of the tilted cutter-frame shown in Fig. 2. When the cutter-frame is in tilted position, it rests against the spring brace or support 9, which is pivoted to the machine-frame, and the lower end of which extends beneath the table 8 and bears against the driving-shaft 11, on which are mounted the gears 10, which serve to actuate the side bars and raise and lower the cutter-frame. It will be seen that by means of this pivoted spring-brace a locking action is secured when the frame is in tilted position and resting against the upper end of the brace 9, for the weight of the tilted frame will cause the lower end of the brace 9 to bear against the driving-shaft 11 and prevent its rotation when the frame is in tilted position, so that danger of accidental rotation of the shaft 11 and throwing out of the cutter-frame from its guides 7 is eliminated. The bars 6, as has been stated, are raised and lowered and the cutting-frame drawn through the butter by the gears 10 on the ends of the shaft 11, journaled in the guides 7 on the machine-frame, which mesh into the racks on the bars. The shaft 11 is turned through the engagement of gears 12 and 13 by the shaft 14, which is operated by the crank 15 at the front of the machine, Fig. 1. The cutting-wires are secured to the cutting-frame 1 by the adjustable supports or clamps 16, in which are mounted yielding keys or fastenings 19. (Illustrated in Figs. 4 and 5.) As there seen and as shown in Figs. 2 and 3, these clamps 16 inclose the outside of the frame 1 and are attached to the latter by the screws 17. In the bottom of the supports or clamps 16 is a sleeve or recess 18, in which is the key or hook 19, to which the cutting-wire 2 is attached. This hook is threaded at its outer end and screws into the thumb-nut 20. Surrounding the key or hook 19 and inclosed between the wall of the recess and the thumb-nut is a spring 21. As the spring acts on the key or hook 19 it produces a yielding bearing on the hook, and consequently on the wire attached to the latter, as the frame and wire are drawn down through the butter, thus forming a yielding pressure on the wire, while maintaining the cutting tension of the latter. To vary the tension of the wire, the key or hook 19 is adjusted by the thumb-screw, as desired, and a longitudinal adjustment given to the wire, without, however, twisting the wire, the hook or key 19 engaging a slot 611 in the clamp 16, so that rotary movement of the hook or key is prevented and twisting effect or disengagement of wire from the key is prevented. By this construction the breakage of the cutting-wires in passing through the butter is avoided, and, furthermore, the tension of the wires accommodate each other, and where they cross one another should one wire have a greater tension than the wire below it the upper wire will yield or give and not injure the wire below.

Figures 6, 7, 8:
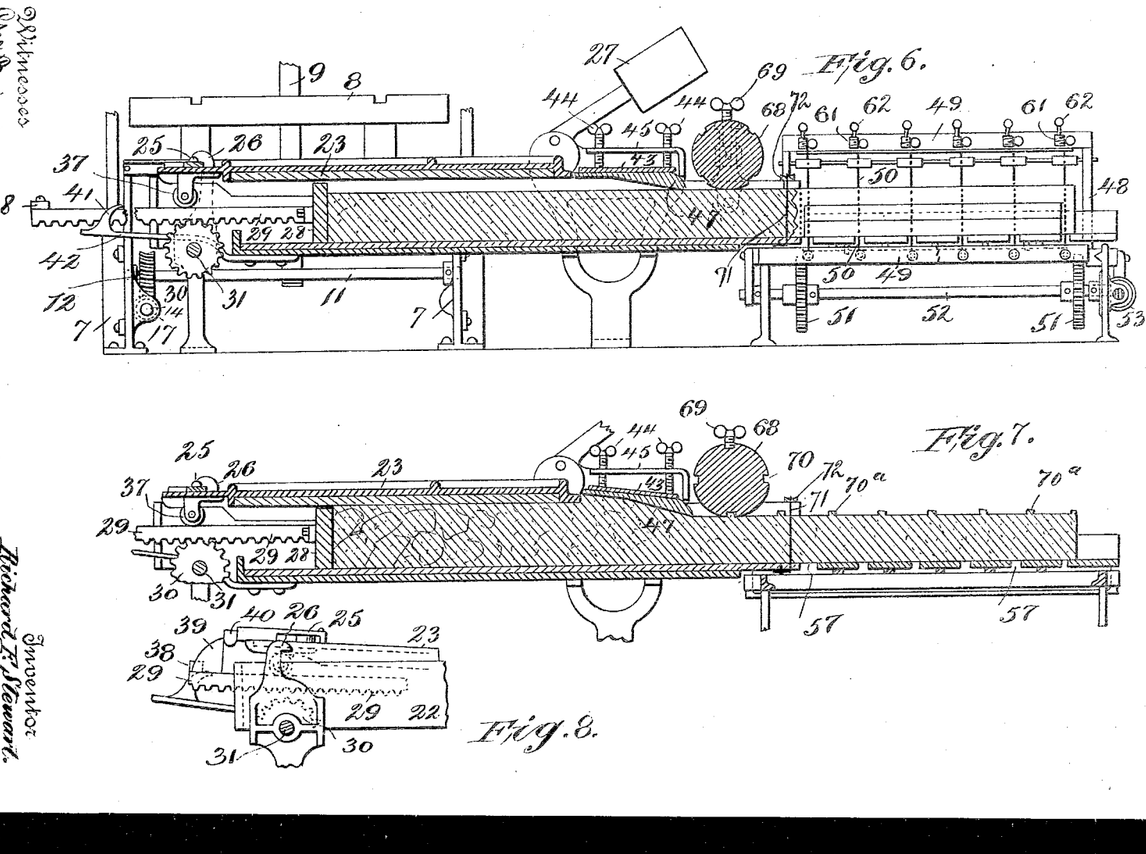

When the slabs or sections of butter have been cut from the original tub or package in the manner described, they are placed in the longitudinal cutting-machine to be cut into block or prints of the size and weight desired. This longitudinal cutting-machine consists of the oblong mold-box 22 of a size to receive the slab of butter cut by the vertical cutter. The box is open at one end and is provided with a lid or hinged top 23, and beyond the open end is a tray or stand 24, which receives the slab of butter as it comes from the box and on which it rests as it is cut into the small blocks or cakes. The depth of the box is greater than the thickness of the slab of butter as the latter is cut, so that when the slab of butter is placed in the box and the top shut down there will be a space between the butter and the under side of the top, as shown in Fig. 6, and the butter can pass or slide freely through the box without being forced or subjected to pressure. The top 23 is held down on the box by the cross-piece 25, which swings under the hooks 26 at each side of the box and is provided with a counterweight 27 to facilitate the opening and closing of the top. The cut slab of butter is pushed or slid through the box by the sliding head or plunger 28, operated by rack-bars 29, engaging with the pinions or gears 30 on the shaft 31. This latter shaft, as shown in Fig. 1, is operated by a worm-gear 32 on a shaft 33, extending along the side of the box and revolved by beveled gears 34 and 35, turned by the shaft 36. The rack-bars 29 are held in engagement with the gears 30 by the wheels 37 on the under side of the top 23. When the top is closed and fastened down, the racks are pressed down on the gears and the engagement of the two is insured. As the top is raised the pressure of the wheels 37 on the rack-bars is removed and the rack-bars are released from their engagement with the gears, thus disconnecting the sliding head from the operating mechanism.

To prevent the butter-forming head or plunger being slid too far forward in pushing the butter from the box and injuring the mechanism, I employ the unlocking device shown in Fig. 8. The ends of the racks 29 are joined by the cross-piece 38, on one end of which is a vertical projection 39, Fig. 8, so situated as to come in contact with a sliding bolt 40 on the top of the mold-box 23. The other end of this bolt is in contact with the cross-piece 25 as the latter rests upon the hook 26 in holding the lid down on the box. When the sliding head 28 has been pushed forward by the racks 29 as far as it is desired to slide the butter from the box or has traveled a predetermined distance, the projection 39 on the back end of the rack strikes the bolt 40, and, pushing it in, slides the cross-piece 25, with which it is in contact, out from under the hooks 26, thus automatically unlocking the lid 23 and allowing it to be raised slightly by the counterweight 27. The raising of the lid removes the pressure of the wheels 31 from the racks 29. At the same time the cross-piece 38 is raised by a projection 41 on a spring-support 42 (presently to be described) and the racks lifted from their engagement with the pinions 30, and the further movement of the sliding head 28 is stopped. The sliding head is therefore disconnected from its operating mechanism when it has reached the end of its stroke or has been pushed as far as desired and its further outward movement prevented, although the shafts and gears may continue to turn.

At the rear end of the mold-box is a spring-support 42, on which the projection 41, hereinbefore referred to, is preferably mounted. This spring-support 42 bears against the under side of the cross-piece 38 and serves to hold the rack-bars 29 out of engagement with the driving-gears 30 when the top 23 of the mold-box is elevated and the rack-bars 29 are relieved of the pressure of the wheels 37 on the under side of the top 23. When the top 23 is closed and locked, the rack-bars 29 will of course be forced down into engagement with the gears 30 against the upward pressure of the spring-support 42. Immediately the automatic unlocking mechanism releases the top 23 the spring 42 disengages the rack-bars 29 and holds them elevated during the return movement of the plunger.

Figure 10:
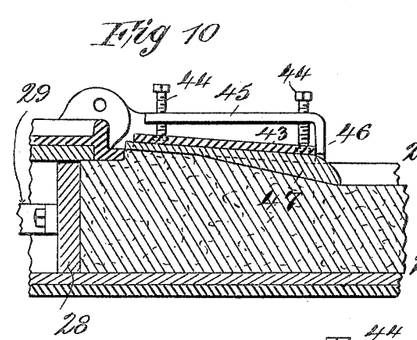
Figs. 10, 11, and 12 are sectional side views of the longitudinal cutting and molding box, showing the molding and regulating mechanism by which the butter is molded and the size and weight of the cut blocks are adjusted.
Figure 11:
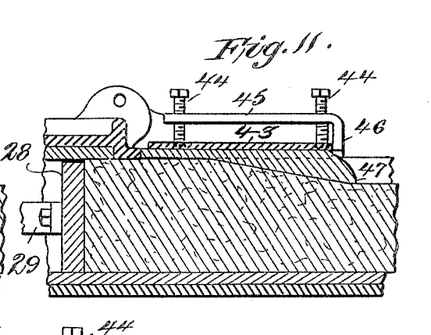
Figure 12:
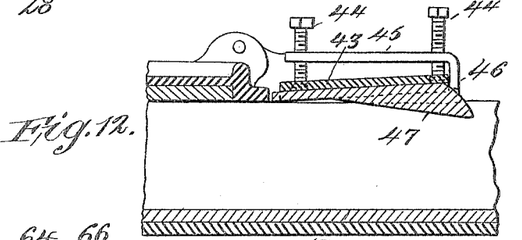
Figure 13:
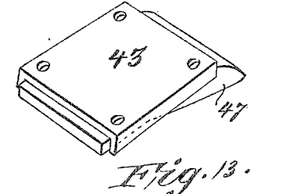
Fig. 13 is a perspective view of the molding and adjusting plate.

When used with the long slab of butter cut by the vertical cutter, the horizontal box above described merely holds and guides the butter as it is pushed onto the cutting table or tray by the follower, thereby insuring the bar of butter moving straight and even through the box and its being cut into regular and equal blocks. It is sometimes found, however, that slabs of butter of the same size vary in weight, and therefore to make them correct weight it is necessary to increase or diminish the size of the slab by adding some butter to or removing it from the slab. This adjusting of the size, and consequently of the weight, of the slab of butter is performed in the box of this horizontal cutting mechanism and is effected by means of the regulating and adjusting device 43. (Shown particularly in Figs. 10, 11, and 12.) This consists of a movable section or plate 43, having a thickened end to give it an angular lower surface, situated at the top of the box, preferably at or near the orifice thereof and back of the lid 23. This regulating-plate 43 is supported and adjusted by the screws 44 at both ends, which pass through the supports 45 on each side of the box. As will be seen from the drawings, by means of these screws 44 either end of the regulating-plate may be elevated or depressed and the plate therefore inclined in either direction and at any angle or may be held level or horizontal, as desired. The ends 46 of the supports 45 are bent downward in such position as to abut against the rearward end of plate 43, and thereby form a brace for the latter and relieve the screws 44 of any side strain.

When the butter in the box is a slab cut the exact size and weight, the adjusting and regulating device 43 may be raised and held horizontal above the butter without touching it, or preferably the rearward end of the plate 43 may be adjusted so as to touch the surface of the butter without pressing, Fig. 6, and thereby hold the slab of butter down as it passes through the box. In these cases the mold-box merely guides the slab onto the cutting-tray and insures the cut block being even and regular. When it is found that the cut blocks of butter are not of the weight desired, and consequently that the size of the butter must be adjusted, the rearward thickened end of the regulating-plate 43 toward the open orifice of the box is raised or lowered, as is found necessary, to adjust the weight. If the weight of the cut block is found to be too great, the rearward end of the plate is depressed the desired distance to cause the angular lower face of the plate 43 to press on the butter and scrape off or remove enough of the latter to reduce the size of the slab to the weight desired. If, on the contrary, the blocks or prints of butter are found to be below the weight desired, the rearward end of the plate is raised above the surface of the slab of butter and some loose butter placed on the top of the latter, which is pressed into the butter by the plate 43 as the slab passes under the edge of the plate, and thus increases the slab to the size desired. It will be seen, therefore, that the size, and consequently the weight, of the slab of butter is adjusted by the thickened rearward end of this regulating-plate 43 as the butter is pushed and guided through the box.

In addition to the function of holding and guiding the previously-cut slab of butter as it passes onto the cutting-tray the box of the horizontal cutting mechanism also molds or forms pieces of butter into a solid homogeneous slab, adapted to be cut into blocks or prints. This operation of molding the slab of butter in the box is shown in Fig. 7. The fragments or pieces of butter left from cutting the slabs or sections from the mass of butter in the tub are placed in the box, together with small pieces of butter laid on top of the slab-sections, and the lid 23 closed and fastened, thus filling the box, as shown in the drawings. As the butter is pushed forward by the head 28 and passes under the molding-plate 43 the latter pushes the loose butter in between the pieces or sections of butter in the box, thus filling up the crevices or interstices and molding the whole into a solid slab, and, furthermore, accomplishing this without pressing or breaking the large sections or pieces of butter in the box. It is very necessary that this molding of the butter into the solid slab be accomplished without pressing the butter so as to injure its grain or press out the liquid or juice, and, further, that the bar be of the desired size and weight. Both these operations are performed by the plate 43, the adjustment of the forward end of the plate, and consequently the inclination of the latter, regulating the molding-pressure on the butter and the adjustment of the rearward end determining the size and weight of the bar. Both these adjustments and operations are performed independent of each other. To mold the butter, the forward end of the plate is adjusted at the desired position, depending on the character of the butter. As the butter is then pushed under the inclined plate the interstices between the pieces of butter are filled and the butter molded and formed into a solid compact slab, and the size, and consequently the weight, of the slab is determined by the position of the rearward end of the plate. The molding-pressure of the plate is thus adjusted independently of and without affecting the adjustment of the rearward end of the plate, which regulates the size and weight of the completed slab. Hence it is thus possible with this improvement to mold or form the slab of butter without regard to the size or weight of the latter or to adjust the size and weight of the slab independently of the molding of the latter. The under side of the plate 43 is preferably formed with an inclined projection 47, so as give an angular lower face and assist the molding operation on the butter. The pressure of the butter by the long inclined surface of the projection 47 is gradual and even, producing just the required pressure to form the butter into the slab without unduly pressing it or injuring its grain. As the butter is pushed through the box the small pieces of butter are thus molded into the single strip or slab of the required size and of just the weight desired. The box is made water-tight, and any water or "juice" that may be pressed from the butter is held in the box and is reabsorbed by the butter as it passes from the box.

Figures 9, 15, 16:
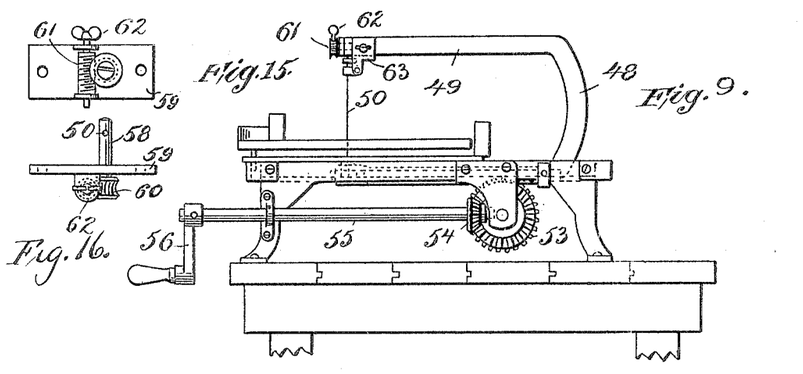

As the butter comes from the horizontal box it passes under a marking-roller 68, which is adjusted by the screw 69. This roller is provided with indentations 70, which form on the surface of the bar of butter raised edges $70^a$ to indicate where the cutting-wires pass through the bar to cut the desired size of blocks. As the slab of butter leaves the mold-box and passes roller 68 it is preferably divided into bars by a fixed cutter-wire 71, mounted at the delivery end of the mold-box, the lower end of said wire engaging a pin or lug $70^b$ on the under side of the box, while its upper end is fastened to an adjustable plate 72, by means of which it may be given a limited adjustment. (See Fig. 16.)

The cutting mechanism by which the strip of butter resting on the tray 24 is cut into blocks consists of a horizontally-sliding frame 48 and 49, holding the vertical cutting-wires 50. The frame is moved back and forth on its bed by the gear-wheels 51 on the shaft 52, which is turned by beveled gears 53 and 54, operated by the shaft 55 and crank 56. To cut the butter, the frame is moved back and forward, so that the wires 50 pass through the strip of butter and cut the latter into blocks, openings 57 being formed in the tray to permit the passage of the wires. The wires 50 are held in posts 58, around which they are coiled, which posts are mounted in plates 59, secured to the front piece 49 of the frame. The posts are turned by the wheels 60, which engage with the worm-screws 61, turned by the keys 62. By this means it is possible to draw and hold the wires very taut.

Figure 14:
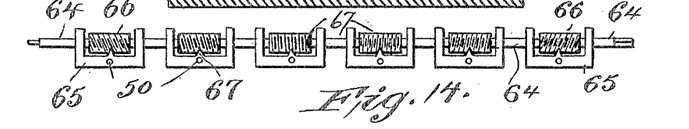
Fig. 14 is a side view of the adjusting device for regulating the distance between the cutting-wires on the longitudinal cutter.

To insure the cutting-wires passing through the butter at lines indicated by the ridges and marked $70^a$, it is sometimes necessary to adjust the position of the wires and at the same time maintain an equal distance between them. Adjustment of the wires 50 is accomplished by the following mechanism: Below the front 49 of the frame and supported by plates 63 on each side of the latter is a rod 64, capable of being turned in its supports. On this rod are a series of loose carriages 65, corresponding to the number of wires 50 through which the wires pass. Within the carriage and fastened to the rod so as to turn with it are worm-screws 66, and on the carriages are fingers 67, engaging with the threads of the worm-screws. As will be understood from Fig. 14 of the drawings, as the rods 64 are turned, turning the screws 66, the fingers 67, engaging with the threads of the screws, slide the carriage 65 along on the rod. Beginning at the middle of the rod the threads of the worm-screws are cut in reverse directions, so that the carriages will move away from the middle toward each side of the frame, and, furthermore, the pitch of the threads of the screws varies from the middle to each side, so as to secure a differential movement of the carriages or supports for the cutting-wires, whereby the outer support 65 moves quicker and farther than the support next to it and the latter quicker and faster than the center support, so that the relative distances between the wires is preserved while they are separated from or brought toward each other.

While I have shown and described a particular construction, it is obvious that numerous changes may be made and other mechanical expedients adopted without departing from the spirit of my invention, and as all such variations in construction are clearly within the purview of my invention I do not limit myself to any of the details shown and described except in so far as I am limited by the prior art.

Having thus described my invention, what I claim, and desire to secure by Letters Patent, is—

1. In a butter-cutting machine the combination with a mold-box to receive the butter, means for forcing the butter through said mold-box, butter molding and shaping means in said mold-box, a fixed cutter at the delivery end of said mold-box to divide the butter into bars, and a set of cutters movable across the line of movement of the bars as they issue from the mold-box to divide the bars in prints.

2. In a butter cutting and molding machine, the box 1, through which the butter passes as it is molded; the molding and regulating plate 43 on the top of the box at or near its orifice, adapted to be adjusted at both ends, as and for the purposes set forth; and mechanism whereby the butter is caused to pass through the box, substantially as described.

3. In a butter cutting and molding machine, in combination, the molding-box 1, through which the butter passes; molding and regulating plate 43 situated at the top of the box, at or near its orifice, adapted to be adjusted at both ends, as and for the purposes set forth; mechanism whereby the butter is caused to pass through the box; and a cutting-frame, provided with adjustable cutting-wires, by which the butter is cut into blocks of equal weight, substantially as described.

4. In a butter cutting and molding machine, in combination, the molding-box 1, through which the butter passes; molding and regulating plate 43 supported at the top of the box by the screws 44, by which the plate is adjusted at both ends, as and for the purposes set forth; screws 44 by which the plate is adjusted; mechanism whereby the butter is caused to pass through the box; marking-roller 68 whereby the butter is marked off into blocks; and a cutting-frame provided with wires, by which the butter is cut into blocks, substantially as described.

5. In a butter cutting and molding machine, in combination, the molding-box, through which the butter passes; lid 23 having the brace 25 by which it is held down on the box; sliding head 28 provided with the racks 29 by which the butter is caused to pass through the box; projection 39 connected to the racks and arranged to engage with the bolt 40 in the brace 25, whereby the pressure of the racks on the pinions 30 is released, and the sliding head disconnected from its operating mechanism when the head has reached the end of its stroke; molding and regulating plate 43, supported at the top of the box by the screws 44, by which the plate is adjusted at both ends, as and for the purposes set forth; screws 44 by which the plate is adjusted; marking-roller 68, by which the butter is marked off into blocks; and cutting-frame 48, 49, having the vertical cutting-wires 50, by which the butter is cut into blocks, substantially as described.

6. In a butter cutting and molding machine, the combination with suitable cutting instrumentalities, of a mold-box, means for forcing the butter through said mold-box, a molding and regulating plate in said mold-box adjacent the path of the butter, and means for changing the angular relation of said plate to the surface of the butter.

7. In a butter cutting and molding machine, the combination with suitable cutting instrumentalities, of a mold-box, means for forcing the butter through said mold-box, a molding and regulating plate in said mold-box adjacent the path of the butter, and means for adjusting the ends of said plate independently to change the angular relation of the plate to the surface of the butter.

8. In a butter cutting and molding machine, the combination with suitable cutting instrumentalities, of a mold-box, means for forcing the butter through said mold-box, a molding and regulating plate having an angular butter-shaping face in said mold-box adjacent the path of the butter, and independently-adjustable supporting-screws at each end of said plate to change its angular relation to the surface of the butter.

9. In a butter cutting and molding machine, the combination with suitable cutting instrumentalities, of a mold-box, means for forcing the butter through said mold-box, a molding and regulating plate having an angular butter-shaping face in said mold-box adjacent the path of the butter, and means for changing the angular relation of the plate to the surface of the butter.

10. In a butter cutting and molding machine, the combination with suitable cutting instrumentalities, of a mold-box, means for forcing the butter through said mold-box, and means for automatically stopping the action of said butter-forcing means at a predetermined time.

11. In a butter cutting and molding machine, the combination with suitable cutting instrumentalities, of a mold-box, means for forcing the butter through said mold-box, driving mechanism for said butter-forcing means, and means for automatically disconnecting said driving mechanism and said butter-forcing means at a predetermined time.

12. In a butter cutting and molding machine, the combination with suitable cutting instrumentalities, of a mold-box having a removable top, means for locking said top in closed position, means for forcing the butter through said mold-box, and means for automatically unlocking said removable top after the said butter-forcing means has traveled a predetermined distance.

13. In a butter cutting and molding machine, the combination with suitable cutting instrumentalities, of a mold-box having a counterbalanced hinged top, means for locking said top in closed position, means for forcing the butter through said mold-box, and means for automatically unlocking said counterbalanced top to allow it to open after said butter-forcing means has traveled a predetermined distance.

14. In a butter cutting and molding machine, the combination with suitable cutting instrumentalities, of a mold-box having a counterbalanced hinged top, means for locking said top in closed position, means for forcing the butter through said mold-box, driving mechanism for said butter-forcing means, means carried by said hinged top to maintain said driving mechanism and said butter-forcing means in operative engagement, and means for automatically releasing said top and disengaging the driving connection between the butter-forcing means and its driving mechanism after the butter-forcing means has traveled a predetermined distance.

15. In a butter cutting and molding machine, the combination with suitable cutting instrumentalities, of a mold-box having a counterbalanced hinged top, means for locking said top in closed position, means for forcing the butter through said mold-box, means for driving said butter-forcing means, means carried by said top to hold said driving means and said butter-forcing means in operative engagement, and means carried by said butter-forcing means to automatically unlock said mold-box top and disengage the connections between said butter-forcing means and said driving mechanism after the said butter-forcing means has traveled a predetermined distance.

16. In a butter cutting and molding machine, the combination with suitable cutting instrumentalities, of a mold-box having a counterbalanced hinged top, means for locking said top in closed position, means for forcing the butter through said mold-box comprising a head or plunger and driving-racks therefor, driving-gears engaging said racks, means carried by said top to keep said racks and gears in operative engagement, means to automatically unlock said top, and means to automatically disengage said racks and driving-gears after the butter-forcing plunger has traveled a predetermined distance.

17. In a butter cutting and molding machine, the combination with suitable cutting instrumentalities, of a mold-box having a counterbalanced hinged top, means for locking said top in closed position, means for forcing the butter through said mold-box comprising a head or plunger and driving-racks therefor, driving-gears for said racks, means carried by said top to keep said racks and gears in operative engagement, means to automatically unlock said top, and means to lift said racks out of engagement with said driving-gears after the butter-forcing plunger has traveled a predetermined distance.

18. In a butter cutting and molding machine, the combination with suitable cutting instrumentalities, of a mold-box having a counterbalanced hinged top, means for locking said top in closed position, a butter-forcing plunger having driving-racks in said mold-box, driving-gears to engage said racks and force said plunger forward, means on said top to hold said racks in engagement with said driving-gears when the top is in closed position, means for automatically unlocking said top, means for automatically disengaging said racks from said driving-gears after the butter-forcing plunger has traveled a predetermined distance, and means for holding said racks disengaged from said driving-gears during the return movement of said butter-forcing plunger.

19. In a butter cutting and molding machine, the combination with suitable cutting instrumentalities, of a mold-box having a counterbalanced hinged top, means for locking said top in closed position, a butter-forcing plunger having driving-racks in said mold-box, driving-gears to engage said racks and force said plunger forward, means on said top to hold said racks in engagement with said driving-gears, when the top is in closed position, means for automatically unlocking said top, means for automatically disengaging said racks from said gears after the butter-forcing plunger has traveled a predetermined distance, and a spring-arm to hold said racks disengaged from said driving-gears during the return movement of said butter-forcing plunger.

20. In a butter cutting and molding machine, the combination with suitable cutting instrumentalities, of a mold-box having a counterbalanced hinged top, means for locking said top in closed position, a butter-forcing plunger having driving-racks in said mold-box, driving-gears to engage said racks and force said plunger forward, means on said top to hold said racks in engagement with said driving-gears when the top is in closed position, means for automatically unlocking said top, and a spring-arm having a projection thereon to lift said racks out of engagement with said driving-gears after the butter-forcing plunger has traveled a predetermined distance, said spring-arm serving to elevate said racks and keep them disengaged from the driving-gears during the return movement of the butter-forcing plunger.

21. In a butter-cutting machine and in combination, a cutter-frame, cutting-wires spanning said frame, adjustable supports for said wire, and means for imparting differential movements to said supports, whereby the cutting-wires may be adjusted and their relative distances preserved.

22. In a butter-cutting machine and in combination, a cutter-frame, cutting-wires spanning said frame, and means for giving differential adjusting movement to said wires, whereby their relative distances from one another may be preserved.

23. In a butter-cutting machine and in combination, a cutter-frame, cutting-wires spanning said frame, adjustable supports for said wires, a rotary worm-shaft, and reversely-threaded worm-screws having differently-pitched threads mounted on said shaft to engage and move said supports, whereby differential movements may be imparted to said cutting-wires and their relative distances preserved.

24. In cutting mechanism for butter-cutting machines, the adjusting mechanism for regulating the distance between the cutting-wires, consisting of the rotating rod 64, having the worm-screw 66 secured thereto; carriages 65 loosely mounted on the rod 64, engaging with worm-screws 66, and carrying the cutting-wires, substantially as and for the purpose described.

Signed by me at Pocantico Hills, New York, this 29th day of August, 1904.

RICHARD F. STEWART.

Witnesses:
E. F. PORTER,
WILLIAM H. ESTWICK.